(12) United States Patent
Salzmann et al.

(10) Patent No.: US 10,093,414 B2
(45) Date of Patent: Oct. 9, 2018

(54) METHOD AND APPARATUS FOR REMOTE, INTERIOR INSPECTION OF CAVITIES USING AN UNMANNED AIRCRAFT SYSTEM

(71) Applicant: Versatol, LLC, McDonough, GA (US)

(72) Inventors: Jared David Salzmann, McDonough, GA (US); J Eric Corban, McDonough, GA (US)

(73) Assignee: Versatol, LLC, McDonough, GA (US)

(*) Notice: Subject to any disclaimer, the term of this patent is extended or adjusted under 35 U.S.C. 154(b) by 0 days.

(21) Appl. No.: 15/335,851

(22) Filed: Oct. 27, 2016

(65) Prior Publication Data

US 2017/0066530 A1 Mar. 9, 2017

Related U.S. Application Data

(60) Provisional application No. 62/246,613, filed on Oct. 27, 2015.

(51) Int. Cl.
| | |
|---|---|
| *B64D 47/08* | (2006.01) |
| *B64C 27/04* | (2006.01) |
| *G05D 1/10* | (2006.01) |
| *B64D 1/08* | (2006.01) |
| *B64D 1/02* | (2006.01) |
| *B64C 39/02* | (2006.01) |

(52) U.S. Cl.
CPC .......... *B64C 27/04* (2013.01); *B64C 39/024* (2013.01); *B64D 1/02* (2013.01); *B64D 47/08* (2013.01); *G05D 1/101* (2013.01); *B64C 2201/024* (2013.01); *B64C 2201/123* (2013.01); *B64C 2201/127* (2013.01); *B64C 2201/145* (2013.01); *B64C 2201/146* (2013.01); *B64D 2203/00* (2013.01); *G05D 2201/0207* (2013.01)

(58) Field of Classification Search
CPC .. B64C 39/024; B64C 2201/127; B64D 47/08
See application file for complete search history.

(56) References Cited

U.S. PATENT DOCUMENTS

| | | | |
|---|---|---|---|
| 8,874,283 B1 | 10/2014 | Cavote | |
| 9,567,077 B2 * | 2/2017 | Mullan | .............. G05D 1/104 |
| 2017/0073071 A1 | 3/2017 | Salzmann | |

* cited by examiner

*Primary Examiner* — Todd M Melton
(74) *Attorney, Agent, or Firm* — Patents and Licensing LLC; Daniel W Juffernbruch

(57) ABSTRACT

An interior length of a confined space is inspected by autonomously flying an unmanned aerial vehicle having a sensor pod. The sensor pod can be tethered to the unmanned aerial vehicle and lowered into the confined space from above perhaps by an electromechanical hoist. An altitude or heading of the sensor pod can be measured. The confined space can be the flue of a chimney.

9 Claims, 8 Drawing Sheets

METHOD AND APPARATUS FOR REMOTE, INTERIOR INSPECTION OF CAVITIES USING AN UNMANNED AIRCRAFT SYSTEM

BACKGROUND OF THE INVENTIONS

1. Technical Field

The present inventions relate to aircraft and internal cavities and, more particularly, the remote inspection of internal cavities using unmanned aircraft.

2. Description of the Related Art

The interior inspection of flues, for example in industrial chimneys, has been documented. Known methods typically require rope and or crane crews to erect scaffolding and then traverse the interior and exterior of a chimney either by repelling on ropes or being lowered with a Bosun's chair. These methods are expensive, time consuming, and hazardous to personnel. Improved methods and tools to inspect the entire interior length of a flue, for example in an industrial chimney, or any other confined space or interior cavity are needed.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Figure 1:
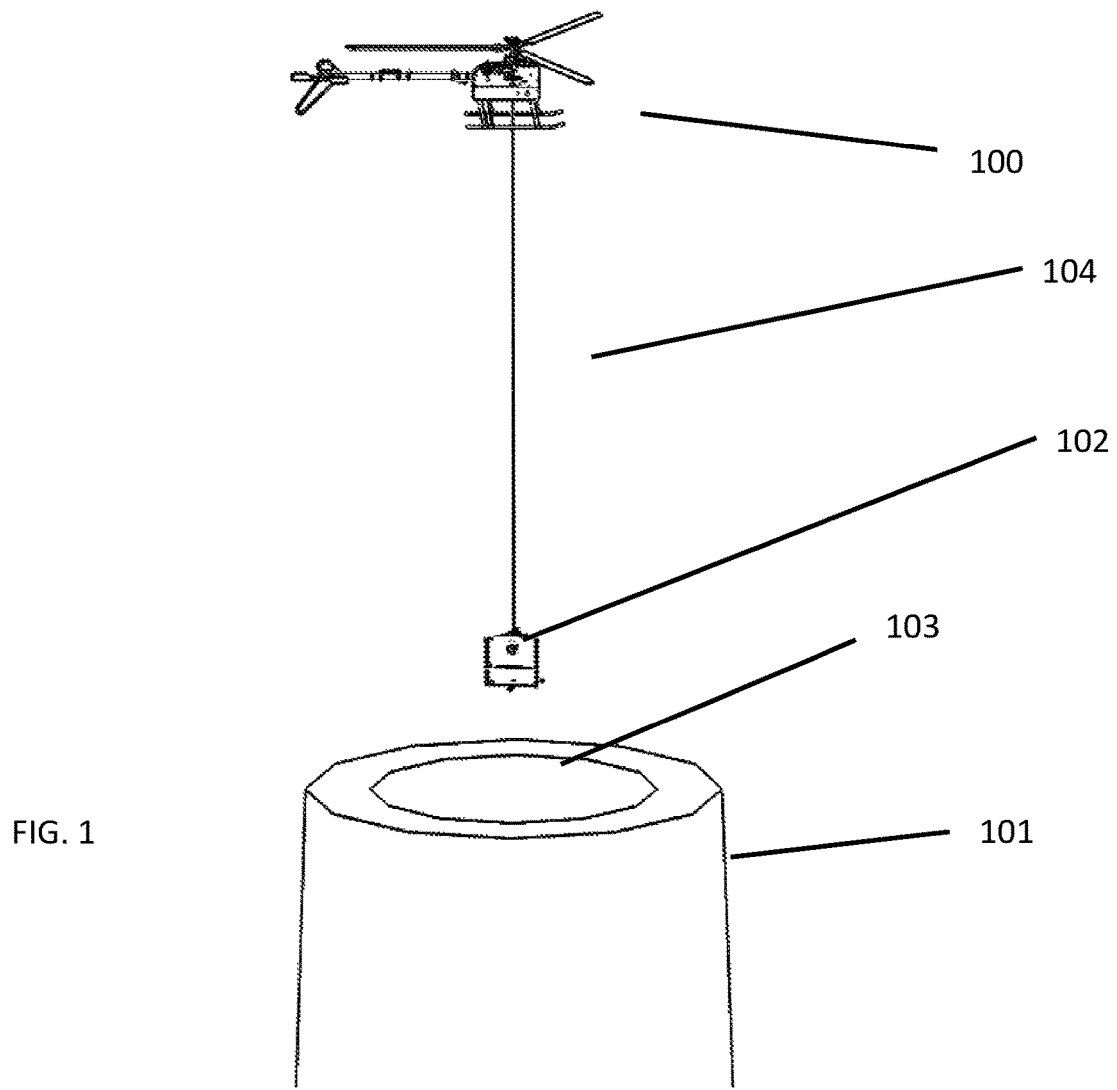
FIG. 1 illustrates an aerial view of an unmanned aerial vehicle hovering above a chimney ready to lower a sensor pod into the flue of a chimney according to embodiments of the present inventions.

Small unmanned aircraft can be outfitted with various sensor packages to remotely perform many different inspection tasks more safely and cost-effectively than is possible when compared to placing a human being very near to, on, or in a confined space to be inspected so that he or she can perform the inspection task directly. The benefits of remote sensing of confined spaces include minimized risk to personnel and increased frequency of inspections. An increased frequency of inspections can allow for benefits such as improved regulation compliance and early identification of structural defects.

A confined space has limited or restricted means of entry or exit, is not designed or configured for continuous occupancy, and has the potential for a significant hazard to be present. In a confined space it can be dangerous and difficult for a person to enter to perform tasks. Safety requirements for inspection of confined spaces can vary by jurisdiction or application.

Unmanned aircraft rely heavily on global positioning system (GPS) signals for autonomous navigation and control. For this reason it is very challenging, given the current state of art, to autonomously navigate an unmanned aerial vehicle indoors, or in any other environment where GPS signals are obscured or denied such as in a confined space. One such environment is the flue of a chimney. For this reason, in order to perform an inspection of the interior length of the flue of an industrial chimney using an unmanned aircraft, it is preferred to utilize the unmanned aircraft in a manner that insures GPS signals will remain readily available to the unmanned aircrafts GPS antennae at all times. One way to do so is the unmanned aircraft is used as a crane with which to position a sensor pod above a chimney (where GPS signals remain readily available), and then lower said sensor pod into the flue of the chimney or any other interior cavity. The sensor pod can then be used to remotely inspect the entire length of the interior walls of the chimneys flue as it is hoisted up and lowered down the length of the chimney.

Alternately, the Unmanned Aircraft can employ sensors that enable it to maintain its position and orientation relative to the chimney despite the possible blockage of GPS signals while flying within the chimney interior. The sensors employed for this purpose may be one or more radio, laser, LED, ultrasonic, computer vision, or other form of ranging device that enable near real-time, near simultaneous measurement of the distance between the Unmanned Aircraft and the interior surfaces of the chimney in all three dimensions. In this case the Unmanned Aircraft may still carry the sensor pod as a slung load, or it may integrate the sensor pod directly into the air frame of the Unmanned Aircraft.

In either case, precise control over the vehicle position is required despite (1) disturbances that may include strong winds and turbulence; (2) for a variety of sensor pods of differing mass and dimension, and (3), in the case of a slung sensor pod that is raised and lowered, precise control of the complete coupled dynamic system is required while the length of the tether is varied. Advanced adaptive flight control technology for precision hover of unmanned air vehicles enables precision placement of the sensor pod. Flight control for precision hover of unmanned air vehicles enabling precision placement of a sensor pod is possible using the adaptive control such as that previously published by the applicant or using neural network based model reference adaptive control.

The sensor pod can be fitted with one or more electronic sensors for remotely inspecting the flue of a chimney or any other interior cavity. These can include but are not limited to cameras of any type with electro-optical or infrared sensors, LIDAR sensors, sonar sensors, barometric ambient air pressure sensors, ultra-sonic sensors for non-destructive testing, laser distance sensor, radar, ambient thermal sensors, and remote thermal sensors. Likewise, the sensor pod and or sensors can be fitted with a robotic arm. The sensor pod can also be fitted with a plurality of lights which can be embodied as light emitting diodes (LED) to continuously illuminate the flue of the chimney during inspection. Likewise, the lights can be embodied as short duration flash light (e.g. flash photography) to periodically illuminate the flue of the chimney during inspection.

A barometric ambient air pressure sensor is used to measure and record the altitude or vertical position of the sensor pod relative to the unmanned aircraft and/or chimney in order to correlate gathered inspection data with a physical location in or along the walls of the flue. In addition, this altitude data can be used to inspect a specific point in the flue or to prevent lowering the sensor pod too low into the flue. The altitude data can be displayed in real time to an operator or can be incorporated into an automatic feedback control algorithm that regulates hoisting speed as well as where the hoisting will stop. Any number of other sensors can be used to measure and record the vertical position of the sensor pod relative to the unmanned aircraft and/or chimney, such as a laser distance sensor, LIDAR sensor, radar distance sensor, ultrasonic distance sensors, computer vision based odometer sensor, inertial navigation unit, and infrared temperature sensors. In addition, a hoisting odometer can be installed in the hoist mechanism that can be used to estimate the altitude of the sensor pod relative to the unmanned aircraft and/or chimney. The sensor pod can comprise a battery to power its integrated electronics and sensors.

A magnetic sensor is used to measure and record the magnetic heading or orientation about the yaw axis of the sensor pod relative to the chimney in order to correlate gathered inspection data with a physical location in or along the walls of the flue. In addition, this heading data can be used to inspect a specific point in the flue. The heading data can be displayed real time to an operator or can be incorporated into an automatic feedback control algorithm that, for example, slowly rotates the sensor pod while it is hoisted up and lowered into the flue. Any number of other sensors can be used to measure and record the heading of the sensor pod relative to the chimney, such as an inertial navigation unit or a computer vision based navigation unit.

The sensor pod's heading or yaw axis is stabilized and controlled using one or more propellers integrated with the sensor pod. Each propeller can be powered by one or more electric motors. The electric motors can be driven clockwise or anti-clockwise such that the propellers can generate left hand or right hand angular thrust. Angular rate (e.g. MEMS) and heading (e.g. magnetometer) sensors detect the heading and rotation rate of the sensor pod and a closed loop feedback control algorithm is used to command said electric motors to power said props in order to generate the necessary angular thrust that will maintain or change the heading of the sensor pod. If propellers are undesired, any mechanism that generates angular thrust can be used (e.g. compressed air directed out nozzles). Finally, if thrust generators are undesired, a spinning disk with sufficient mass and angular momentum can be used to prevent significant heading changes if mounted in the sensor pod vertically. If the spinning disk's axis is actuated 90 degrees out of phase of the disk's rotational axis, the gyroscopic precession effect can be used to impart angular momentum into the sensor pod, thus changing the heading of the sensor pod.

The sensor pod's lateral position in the flue can be stabilized using one or more propellers integrated with the sensor pod. Each propeller can be powered by one or more electric motors. Range sensors (e.g. laser, ultrasonic, or radar distance sensors) detect the lateral position and velocity of the sensor pod in the flue and a closed loop feedback control algorithm can be used to command said electric motors to power said props in order to generate thrust to either center the sensor pod in the center of the flue or position the sensor pod closer to the wall for more detailed inspection. If propellers are undesired, any mechanism that generates thrust can be used (e.g. compressed air directed out nozzles).

A control mixing scheme can be used such that a single set of motors and propellers can be used to generate angular thrust to control heading and lateral thrust to control lateral position in the flue.

The sensor pod and/or sensitive components can be fully sealed to allow easy cleaning if the sensor pod comes in contact with contaminated surface or contaminated air. One or more gaskets can be used to seal the sensor pod. The sensor pod and/or sensitive components can be heat resistant or sufficiently cooled, either actively or passively, to allow entry of the sensor pod in a hot environment.

One or more data receivers can be integrated with the sensor pod and receive commands from operators on the ground. The commands can be distributed to the sensor, sensor accessories, lights, the hoist and the sensor pod heading control mechanism.

One or more video and data transmitters can be integrated with the sensor pod and transmit real time video and data to a receiver integrated with the unmanned aircraft and rebroadcast to operators on the ground or directly transmitted from the sensor pod to operators on the ground.

A hoist is mounted to the unmanned aircraft with which to raise and lower the sensor pod relative to the unmanned aircraft. The hoist can comprise one or more electric motors and gearboxes as well as a drum or lift-wheel around which rope or cable wraps. The hoist is comprised of integrated radio receivers for remote control of said electric motors by operators from the ground as well as can be controlled through an electronic interface with the unmanned aircraft. An electromechanical brake can be used to prevent unwinding of the drum in the case of failure of the electric motor. A miniature computer can also be programmed to control the electric motors at a specific rate and or to a specific altitude either by an operator or as a part of a pre-programmed action. An actuated release mechanism can be mounted to the unmanned aircraft, wherein the hoist comprises a mechanical interface compatible with the actuated release mechanism mounted on the unmanned aircraft. Likewise, the hoist can comprise an actuated release mechanism for detaching the hoist from the aircraft while in flight or at any other time and the unmanned aircraft can comprise a mechanical interface compatible with the actuated release mechanism mounted on the hoist. A rope, tether, or cable, which can be embodied as braided high strength fibers, is spooled onto the drum or lift-wheel of the hoist and then used to suspend the sensor pod below the unmanned aircraft for inspecting the flue of industrial chimneys. Likewise, the hoist can be integral to the sensor pod with the rope, tether, or cable attached to the unmanned aircraft. The rope can also be embodied as a fiber-optic data link or conductive communications wire to transmit data and power between the unmanned aircraft and the sensor pod.

A swivel device is located along the tether, a hoisting rope or cable, to allow the sensor pod and the unmanned aircraft or tether to rotate freely relative to each other. If the tether is embodied as a cable with communications link, slip ring devices can be integrated with the swivel device and the hoist.

The sensor pod hoisting line attachment point can be varied relative to the sensor pod's center of gravity. Placed above, the sensor pod is naturally stable in roll and pitch. Placed at the center of gravity, the sensor pod is neutrally stable in roll and pitch. Aerodynamic or gyroscopic thrusters could be used to stabilize the sensor pod or to change the roll and pitch axis. For example, to point the sensor up or down. The sensor pod tether attachment point can be embodied as a single point, dual points or three points of attachment. A single point can be used to allow roll and pitch axis control. Dual points can be used to allow roll or pitch axis control. Three points of attachment will naturally prevent roll or pitch deviations.

The sensor and related equipment mounted in the sensor pod can be mounted through a series of one or more axis of rotation. When these axis are actuated, embodied as a single or multi axis sensor gimbal, the sensor can be stabilized relative to the sensor pod or can be pointed by the operator. The sensor pod can be integrated with a robotic arm.

To inspect the interior flue of an industrial chimney with an unmanned aircraft the following method is used. An unmanned aircraft, embodied as a rotorcraft, is outfitted with a sensor pod. The sensor pod may be mounted directly to or slung below the airframe of the unmanned aircraft that will enter and navigate the flue interior. Alternately the unmanned aircraft may be outfitted with an electromechanical hoist. It should be noted that the unmanned aircraft can be embodied as an air vehicle of any type. The hoist is spooled with tether, which can be embodied as rope, cable, or high-strength braided fiber. At the end of said tether a sensor pod is attached. The unmanned aircraft is launched from a take-off and landing site located in close-proximity to the flue or interior cavity to be inspected with the sensor pod mounted on the airframe or slung below. The unmanned aircraft can have tall landing gear to facilitate locating the sensor pod directly under the unmanned aircraft. Likewise, the sensor pod, when transported as a slung load, can be placed next to the unmanned aircraft and subsequently picked up when the unmanned aircraft takes off. Once in flight the unmanned aircraft and its sensor pod payload is navigated, either autonomously, semi-autonomously, or manually, to a position directly above the flue of the chimney. Once in position the unmanned aircraft is commanded to hover at this GPS position. At this time, the slung sensor pod payload is ready to be lowered into the flue of the chimney. An operator on the ground verifies that the helicopter is in position using video being transmitted from the unmanned aircraft and/or sensor pod. Alternately, sensors can be used to verify that the helicopter is in correct position relative to the chimney opening. The operator then, through a radio link with either the unmanned aircraft, the sensor pod, or the hoist integrated with the unmanned aircraft, commands the sensor pod to begin recording data and or turn its lights on and the hoist to begin lowering the sensor pod into the flue of the chimney. Alternately, the system may autonomously initiate data collection. The sensor pod enters the flue of the chimney and is then lowered to the base of the flue of the chimney or as low as desired. Once the sensor pod reaches the low point, the hoist is then commanded to begin raising the sensor pod out of the chimney. The sensor pod can autonomously identify that it has reached the bottom of the chimney by measuring its altitude using one or more laser, ultrasonic, radar, barometric pressure or other type of altimeter. Likewise, the operator can identify that the sensor pod has reached the bottom of the chimney manually using a video feed being transmitted from the sensor pod, to the helicopter and then relayed to the operator on the ground. Likewise the video feed can be transmitted directly from the sensor pod to the operator on the ground. Alternately the unmanned aircraft may be equipped to autonomously navigate internal to the flue or internal cavity, will enter the flue or interior cavity with the sensor pod, and use its normal or augmented means of flight control and its relative navigation solution to autonomously maintain its position relative to the walls of the chimney and to traverse its length. The unmanned aircraft may also employ mechanical means to locate itself relative to the walls of the chimney, or to allow it to come into contact with the walls of the chimney without disrupting the function of the unmanned aircraft or the sensor pod. This could be one or more passive arms, active arms with sensors and/or actuators, sets of rollers, or protective shrouds or shields. As the sensor pod is lowered and raised along the length of the flue of the chimney various data is collected by one or more electronic sensors that can include but are not limited to cameras of any type with electro-optical or infrared sensors, LIDAR sensors, sonar sensors, barometric ambient air pressure sensors, ultra-sonic sensors for non-destructive testing, laser distance sensor, radar, ambient thermal sensors, robotic arms and remote thermal sensors. The data collected by these sensors can be stored on a data storage device integrated with the sensor pod or sensors themselves. Likewise the data collected by these sensors can be transmitted to the unmanned aircraft for storage. Likewise the data collected by these sensors can be transmitted to the ground for storage or for viewing in real time by an operator. The raising and lowering of the sensor pod can be stopped at any time at the command of the operator to more carefully inspect any given area of interest. Once the sensor pod is fully retracted from the flue of the chimney the unmanned aircraft is commanded to return to the landing site either autonomously, semi-autonomously, or manually. The unmanned aircraft can have tall landing gear to facilitate locating the sensor pod directly under the unmanned aircraft during landing. Likewise, the sensor pod can be lowered next to the landing site and the unmanned aircraft subsequently lands at the landing site.

FIG. 1 illustrates an aerial view of an unmanned aerial vehicle 100 hovering above a chimney 101 ready to lower a sensor pod 102 into the flue 103 of a chimney 101 according to embodiments of the present inventions. In FIG. 1 an unmanned aircraft 100, embodied as a rotor-craft, lowers a slung payload, embodied as a sensor pod 102, suspended by a tether 104 into the flue 103 of a chimney 101. The sensor pod 102 is lowered into the flue 103 for the purpose of inspecting its interior from the top to bottom. It should be noted that the flue 103 can be embodied as any internal cavity or entrance to thereof. Once positioned above, an electromechanical hoist 200 integrated with the unmanned aircraft 100 is commanded to lower the sensor pod 102 into the flue 103 of the chimney 101 until it reaches the base of the flue 103 or a specific point of interest within the flue. While the sensor pod 102 is being lowered and raised through the flue 103 of the chimney 101, one or more sensors integrated with the sensor pod 102 remotely collect various data to be used for assessing the condition and structural integrity of the interior walls of the flue 103 being inspected.

Figure 2:
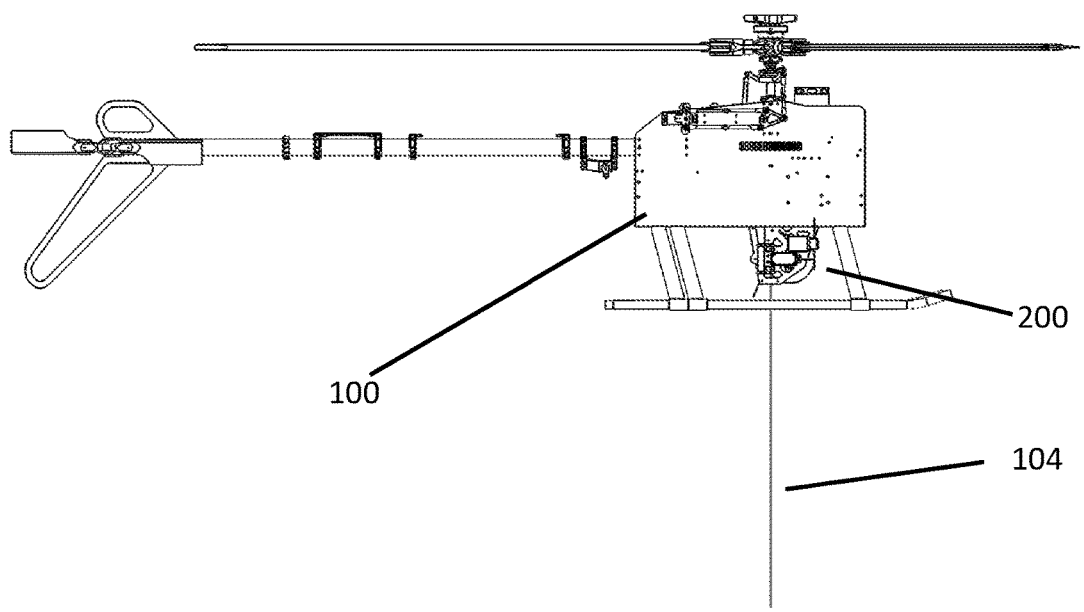
FIG. 2 illustrates a side view of an unmanned aerial vehicle integrated with an electronic hoist used for raising and lowering its slung payload, embodied as a sensor pod, into the flue of a chimney or other interior cavity according to embodiments of the present inventions.

FIG. 2 illustrates a side view of an unmanned aerial vehicle 100 integrated with an electronic hoist 200 used for raising and lowering its slung payload, embodied as a sensor pod 102, into the flue 103 of a chimney 101 or other interior cavity according to embodiments of the present inventions. In FIG. 2 the unmanned aircraft 100 is integrated with an electromechanical hoist 200 for raising and lowering the slung sensor pod 102 payload into and out of the flue 103 of a chimney 101. The sensor pod 102 is suspended from the electromechanical hoist 200 by a tether 104.

Figure 3:
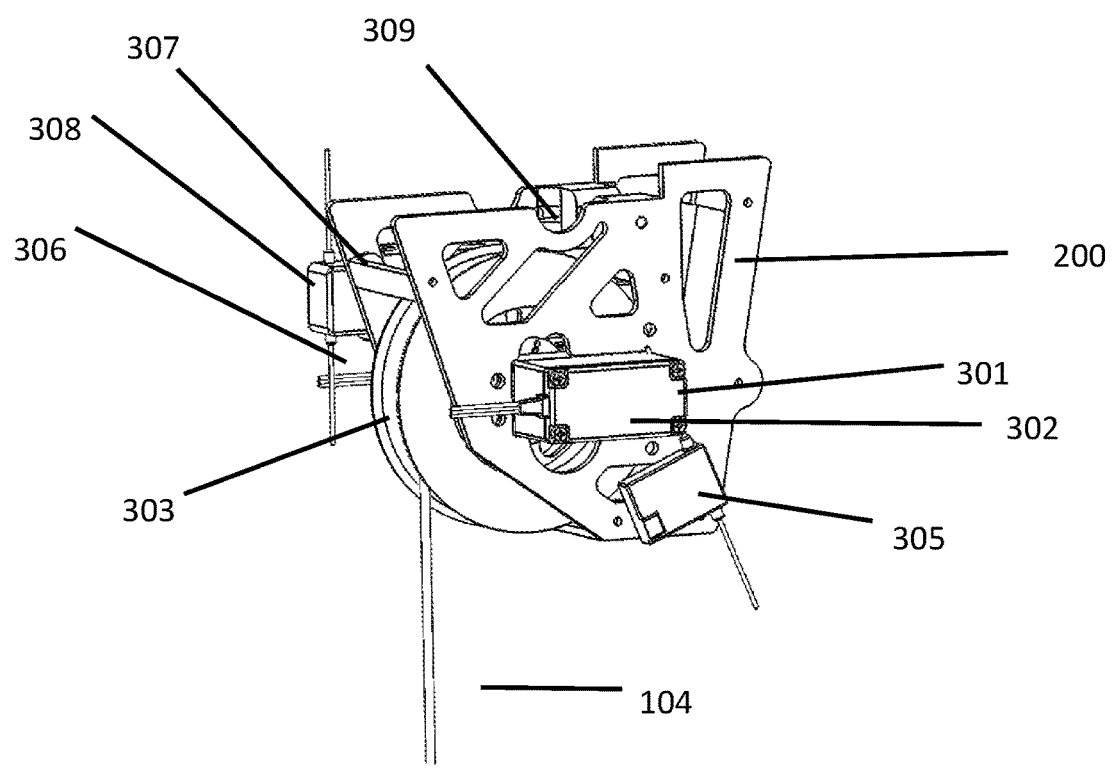
FIG. 3 illustrates a detailed side view of the electronic hoist according to embodiments of the present inventions.

FIG. 3 illustrates a detailed side view of the electronic hoist 200 according to embodiments of the present inventions. The electromechanical hoist 200 can comprise one or more electric motors 301. The electric motors 301 can be embodied with integrated gearboxes 302. Said motors 301 and integrated gearboxes 302 drive a drum 303 around which a tether 104 wraps. Integrated radio receivers 305 enable remote control of the electric motors 301 by operators on the ground. Likewise, the electric motors 301 can be controlled through a wired interface 306 with the unmanned aircraft 100. An electromechanical brake 307 can be integrated to prevent unwinding of the drum 303 in the case of failure of the electric motor 301. A miniature computer 308 can also be programmed to control the electric motors 301 at a specific rate and or to a specific altitude either by an operator or as part of a pre-programmed action. The tether 104, which can be embodied as braided high strength fibers, is spooled onto the drum 303 of the electromechanical hoist 200 and then used to suspend the sensor pod 102 below the unmanned aircraft 100 for inspecting a flue 103. The tether 104 can also be embodied as a fiber-optic data link or conductive communications wire to transmit data and power between the unmanned aircraft 100 and the sensor pod 102. In addition, a hoisting odometer 309 can be installed in the electromechanical hoist 200 that can be used to estimate the altitude of the sensor pod relative to the unmanned aircraft 100 and/or flue 103.

Figure 4:
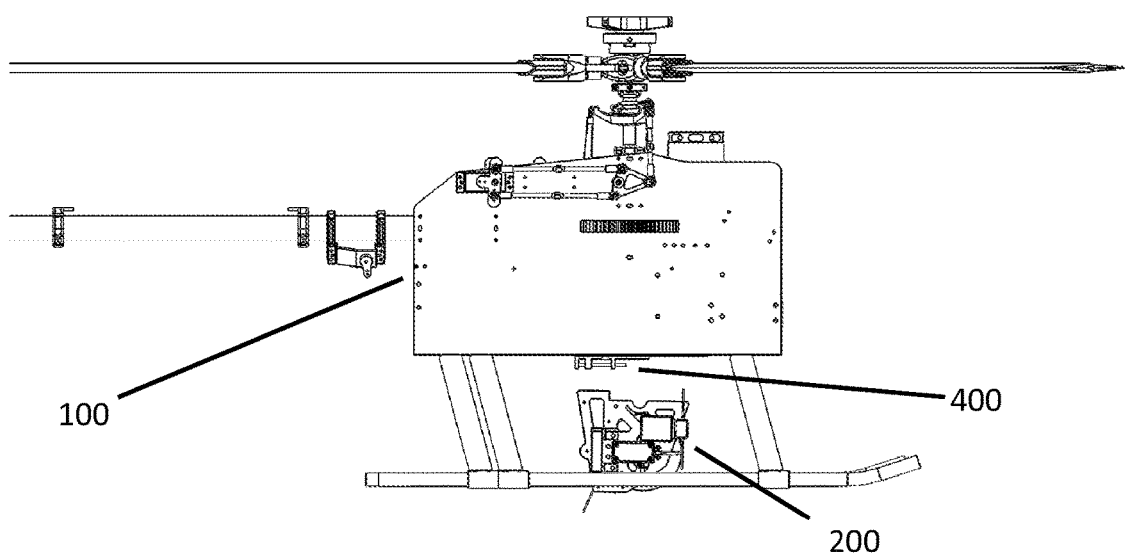
FIG. 4 illustrates a side view of an electronic hoist being detached from the unmanned aircraft using an actuated release mechanism according to embodiments of the present inventions.

FIG. 4 illustrates a side view of an electronic hoist 200 being detached from the unmanned aircraft 100 using an actuated release mechanism 400 according to embodiments of the present inventions. The actuated release mechanism 400 is integrated with the unmanned helicopter 100. Likewise, the actuated release mechanism 400 can be integrated with the electromechanical hoist 200.

Figure 5:
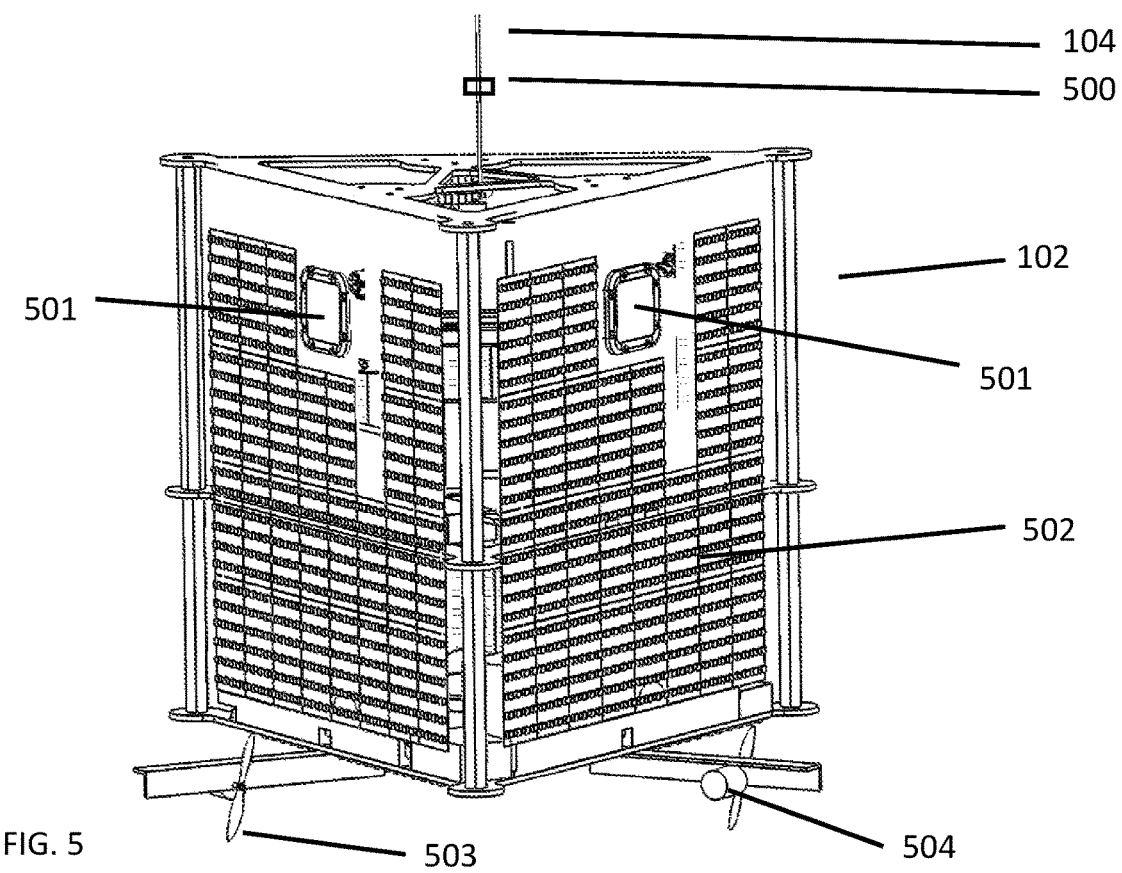
FIG. 5 illustrates an orthogonal view of a sensor pod that can be slung below an unmanned aircraft by a tether and lowered into the flue of an industrial chimney for remotely inspecting its interior length according to embodiments of the present inventions.

FIG. 5 illustrates an orthogonal view of a sensor pod 102 that can be slung below an unmanned aircraft by a tether 104 and lowered into the flue 103 of an industrial chimney 101 for remotely inspecting its interior length 103 according to embodiments of the present inventions. Likewise the sensor pod 102 can be integral to the airframe of the unmanned aircraft 100. A swivel device 500 is located along the tether 104, a hoisting rope or cable, to allow the sensor pod 102 and the unmanned aircraft 100 or tether 104 to rotate freely relative to each other. If the tether 104 is embodied as a cable with communications link, slip ring devices can be integrated with the swivel device 500 and the electromechanical hoist 200. The sensor pod 102 can be fitted with one or more electronic sensors 501 for remotely inspecting the flue 103 of a chimney 101. The electronic sensors 501 can be embodied as cameras of any type with electro-optical or infrared sensors, LIDAR sensors, sonar sensors, barometric ambient air pressure sensors, ultra-sonic sensors for non-destructive testing, laser distance sensor, radar, ambient thermal sensors, and remote thermal sensors or any other electrically powered sensor. The sensor pod 102 can also be fitted with one or more lights 502 which can be embodied as light emitting diodes (LED) to continuously illuminate the flue 103 or any other internal cavity during its inspection. Likewise, the lights 502 can be embodied as short duration flash light (e.g. flash photography) to periodically illuminate the flue 103 during inspection. The sensor pod's 102 heading or yaw axis is stabilized and controlled using one or more propellers 503 integrated with the sensor pod 102. Each propeller 503 can be powered by one or more electric motors 504. The electric motors 504 can be driven clockwise or anti-clockwise such that the propellers 503 can generate left hand or right hand angular thrust.

Figure 6:
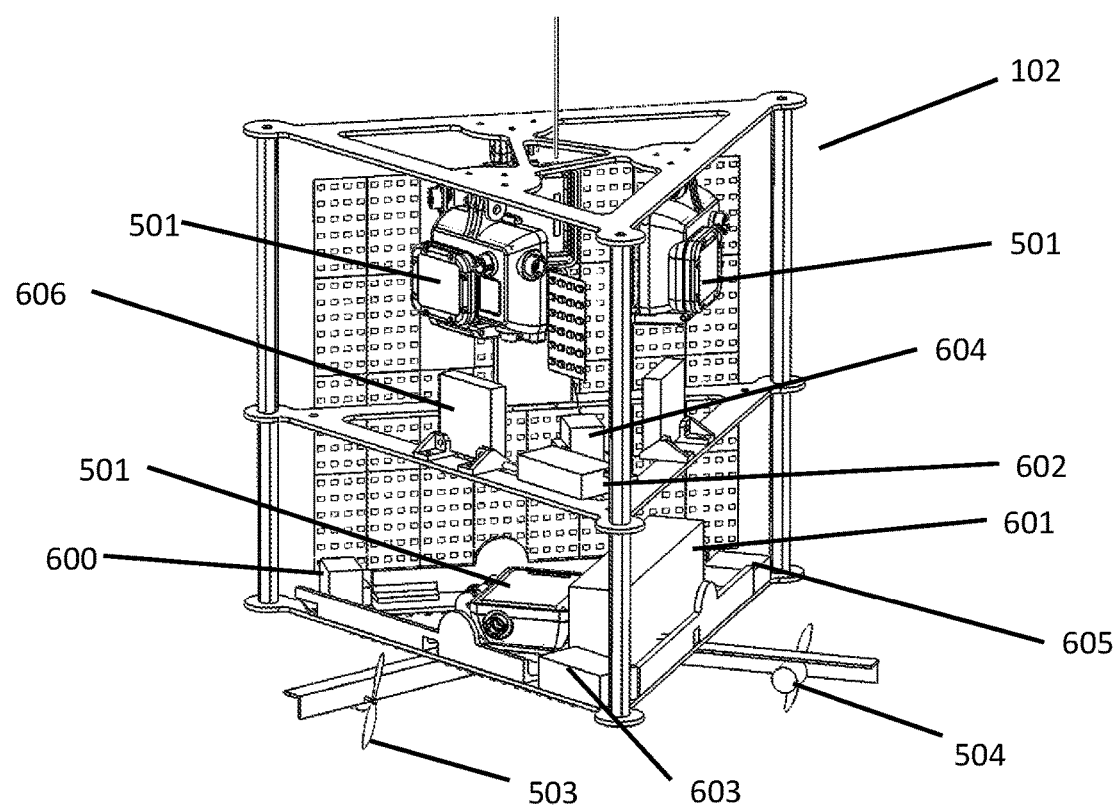
FIG. 6 illustrates an orthogonal view of the interior components of a sensor pod that can be slung below an unmanned aircraft and lowered into the flue of an industrial chimney for remotely inspecting the length of its flue 103 according to embodiments of the present inventions.

FIG. 6 illustrates an orthogonal view of the interior components of a sensor pod 102 that can be slung below an unmanned aircraft 100 and lowered into the flue 103 of an industrial chimney 101 for remotely inspecting the length of its flue 103 according to embodiments of the present inventions. In FIG. 6 the interior components of a sensor pod 102 can be slung below and unmanned aircraft 100 and hoisted into the flue 103 of an industrial chimney 101 or any other internal cavity for remote inspection tasks. Angular rate (e.g. MEMS) sensors 604 and heading (e.g. magnetometer) sensors 602 detect the heading and rotation rate of the sensor pod 102 and a closed loop feedback control algorithm is used to command said electric motors 504 to power said propellers 503 in order to generate the necessary angular thrust that will maintain or change the heading of the sensor pod 102. A barometric ambient air pressure sensor 600 is used to measure and record the altitude or vertical position of the sensor pod 102 relative to the unmanned aircraft 100 and/or flue 103 in order to correlate gathered inspection data with a physical location in or along the walls of the flue 103. In addition, this altitude data can be used to inspect a specific point in the flue 103 or to prevent lowering the sensor pod 102 too low into the flue 103. The altitude data can be displayed in real time to an operator or can be incorporated into an automatic feedback control algorithm that regulates hoisting speed as well as where the hoisting will stop. Any number of other sensors can be used to measure and record the vertical position of the sensor pod relative to the unmanned aircraft 100 and/or flue 103, such as a laser distance sensor, LIDAR sensor, radar distance sensor, ultrasonic distance sensors, computer vision based odometer sensor, inertial navigation unit, and infrared temperature sensors. The sensor pod can comprise a battery 601.

A magnetic sensor 602 is used to measure and record the magnetic heading or orientation about the yaw axis of the sensor pod 102 relative to the chimney 101 in order to correlate gathered inspection data with a physical location in or along the walls of the flue 103. In addition, this heading data can be used to inspect a specific point in the flue 103. The heading data can be displayed real time to an operator or can be incorporated into an automatic feedback control algorithm that, for example, slowly rotates the sensor pod while it is hoisted up and lowered into the flue. Any number of other sensors can be used to measure and record the heading of the sensor pod relative to the chimney, such as an inertial navigation unit or a computer vision based navigation unit. One or more data receivers 602 can be integrated with the sensor pod and receive commands from operators on the ground. The commands can be distributed to the sensor, sensor accessories, lights, the hoist and the sensor pod 102 heading control mechanism. One or more video and data transmitters 603 can be integrated with the sensor pod 102 and transmit real time video and data to a receiver integrated with the unmanned aircraft 100 and rebroadcast to operators on the ground or directly transmitted from the sensor pod to operators on the ground. A data storage device 606 is also integrated with the sensor pod 102.

Figure 7:
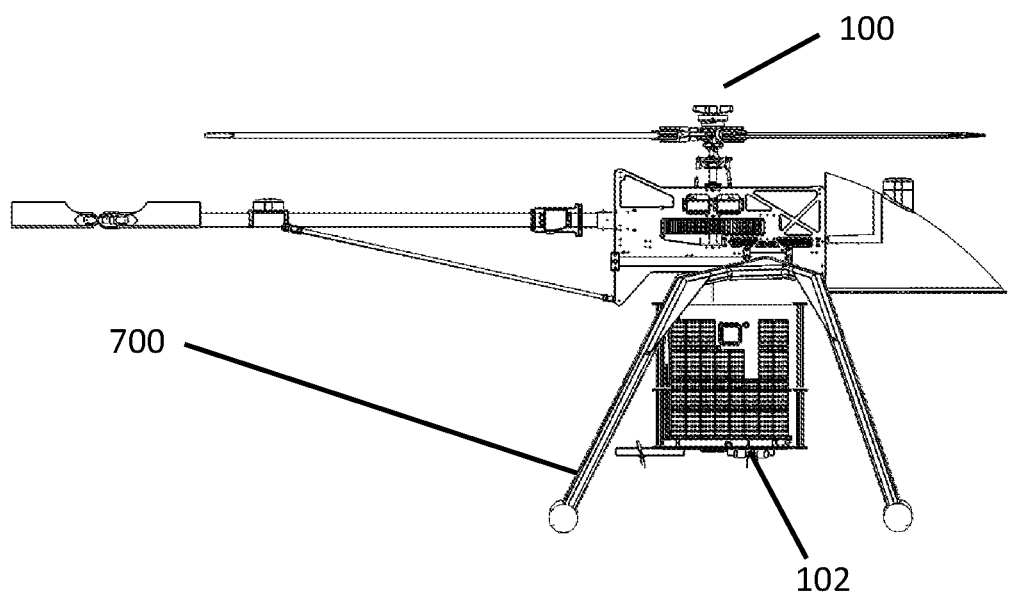
FIG. 7 illustrates a side view of an unmanned aircraft with tall landing gear landing with a sensor pod slung directly beneath according to embodiments of the present inventions.

FIG. 7 illustrates a side view of an unmanned aircraft 100 with tall landing gear 700 landing with a sensor pod 102 slung directly beneath according to embodiments of the present inventions. The tall landing gear 700 provides sufficient clearance directly beneath the unmanned aircraft 100 such that it can land with the sensor pod 102 slung directly beneath.

Figure 8:
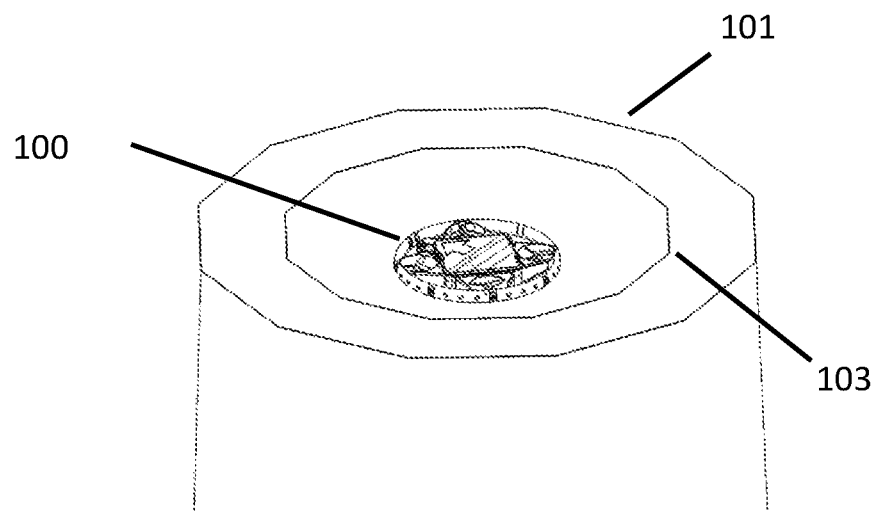
FIG. 8 illustrates an orthogonal view of an unmanned aircraft, embodied as a multi-rotor, flying into the flue, which can be embodied as any internal cavity or entrance thereof, to perform a remote inspection according to embodiments of the present inventions.

FIG. 8 illustrates an orthogonal view of an unmanned aircraft 100, embodied as a multi-rotor, flying into the flue 103, which can be embodied as any internal cavity or entrance thereof, to perform a remote inspection according to embodiments of the present inventions. In this case sensors are integral to the airframe of the unmanned aircraft 100 but can also be embodied as a sensor pod 102 slung below the unmanned aircraft 100.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An apparatus for inspecting at least the interior length of a confined space comprising:
   an unmanned aerial vehicle;
   a sensor pod operatively coupled to the unmanned aerial vehicle; and
   a length adjustable tether configured to operatively couple the sensor pod to the unmanned aerial vehicle and lower the sensor pod into a confined space from above.

2. An apparatus according to claim 1, wherein the confined space is the flue of a chimney.

3. An apparatus according to claim 1, further comprising a controller configured to autonomously fly the unmanned air vehicle.

4. An apparatus according to claim 1, further comprising an electronic sensor integrated with the sensor pod configured to gather data while inside the confined space.

5. An apparatus according to claim 1, further comprising a camera integrated with the sensor pod configured to record imagery.

6. An apparatus according to claim 1, further comprising lights integrated with the sensor pod configured to light an inside of the confined space.

7. An apparatus according to claim 1, further comprising an electronic sensor integrated with the sensor pod and configured to measure an altitude of the sensor pod.

8. An apparatus according to claim 1, further comprising an electronic sensor operatively coupled with the sensor pod and configured to measure a heading of the sensor pod.

9. An apparatus according to claim 1, further comprising an electromechanical hoist operatively coupled to the length adjustable tether and configured to raise and lower the sensor pod suspended by the unmanned aerial vehicle in and out of the flue of the chimney.

\* \* \* \* \*